United States Patent [19]
Burger et al.

[11] Patent Number: 4,508,937
[45] Date of Patent: Apr. 2, 1985

[54] METHOD AND CIRCUITRY FOR ENCODING TELEPHONE RINGING SIGNALS

[75] Inventors: William A. Burger, Eatontown, N.J.; David M. Embree, Reading, Pa.; Martin H. Singer, Fair Haven, N.J.; David R. Vogelpohl, Indianapolis, Ind.

[73] Assignees: AT&T Information Systems Inc., Homdel; Bell Telephone Laboratories, Inc., Murray Hill, both of N.J.

[21] Appl. No.: 470,149

[22] Filed: Feb. 28, 1983

[51] Int. Cl.³ .............................................. H04M 1/00
[52] U.S. Cl. .................................. 179/84 T; 179/84 R; 179/84 VF; 179/84 SS
[58] Field of Search ................. 179/84 R, 84 T, 84 A, 179/99 P, 51 AA, 18 HB, 34 SS; 340/384 E, 345; 375/37, 44, 59; 331/47, 48; 332/16 R

[56] References Cited

U.S. PATENT DOCUMENTS

| | | | |
|---|---|---|---|
| 3,740,490 | 6/1973 | McAlonie et al. | 179/84 T X |
| 3,867,585 | 2/1975 | Morstadt | 179/84 T |
| 4,081,617 | 3/1978 | Clark | 179/84 T |
| 4,193,257 | 3/1980 | Watkins | 340/384 E X |
| 4,276,448 | 6/1981 | Embree et al. | 179/84 T |
| 4,309,574 | 1/1982 | Sublette et al. | 179/84 T |

OTHER PUBLICATIONS

Chapman et al., "Melodic Telephone Ringer", Popular Electronics, Nov. 1981, pp. 57–59.

Primary Examiner—Gene Z. Rubinson
Assistant Examiner—James L. Dwyer
Attorney, Agent, or Firm—John A. Caccuro

[57] ABSTRACT

In the disclosed coded telephone ringing signal method and circuitry, audibly distinguishable ringing codes are generated by alternately shifting between at least a pair of single frequency tones at different modulation rates. Other distinguishable ringing codes are generated by changing both the modulation rates and tone frequencies utilized.

12 Claims, 5 Drawing Figures

COMPARATOR OPERATION

|    | FA<br>1.25 f1/f1 | FB<br>1.25 f2/f2 | FC<br>1.25 f3/f3 | FD<br>1.25 f4/f4 |
|----|------|------|------|------|
| MA | 1 |   | 2 |   |
| MB |   | 5 |   | 6 |
| MC | 3 |   | 4 |   |
| MD |   | 7 |   | 8 |

4,508,937

METHOD AND CIRCUITRY FOR ENCODING TELEPHONE RINGING SIGNALS

TECHNICAL FIELD

This invention relates to ring signaling and more particularly, to a method and circuitry for encoding telephone ringing signals.

BACKGROUND OF THE INVENTION

Telephone users often find it desirable to have information about the origin and/or destination of a received call prior to the call being answered. Some telephone communication systems now provide users with call origin information using a distinctive ringing signal which identifies whether the received call is an external (central office), an internal (intercom), or a priority call.

In other telephone communication systems, users are provided with call destination information using a personalized ringing signal. Personalized ringing enables each user to determine whether he or she is the intended recipient of an incoming call by listening to and decoding the ring signal. These distinctive and/or personalized ringing features are provided in communication systems using a coded ringing signal.

In one prior coded ringing circuit, each ringing code is comprised of a different pair of single frequency tones which are alternately enabled at a predetermined modulation rate during the ringing cycle. In such a circuit, however, the ability of the listener to discriminate between different frequency pairs limits the number of frequency pairs that can be utilized. Undesirably, this results in a small number of distinguishable ringing codes.

SUMMARY OF THE INVENTION

A method and circuitry are disclosed for providing coded ringing signals for a communication system. According to the present invention, during the existence of a received ringing signal different ringing codes are locally generated for the user from at least one pair of single frequency tones by utilizing different modulation rates to alternately enable the two tones. Each modulation rate is selected to assure easy listener discrimination from the other modulation rates utilized.

Additional ringing codes are generated by changing both the modulation rate and the tone frequencies utilized. The result is that the perceived distinction between two codes using different frequency pairs is enhanced by utilizing a different modulation rate for each frequency pair. That is, the combination of two auditory dimensions, frequency and modulation rate, yields an inter-ring discriminability that is greater than the discriminability produced by frequency or modulation rate differences alone. Thus, for example, a ringing code using frequency pair FA at modulation rate MA is auditorally distinguishable from a ringing code using frequency pair FB at modulation rate MB even though neither the frequency pairs nor the modulation rates are themselves distinguishable. Similarly, while listeners may not be able to distinguish two ringing codes which use the same frequency pairs FA and which differ only in the modulation rate MA and MB utilized, changing the frequency pair utilized with the one of the codes results in listener discrimination between the two ringing codes.

The combination of these two different auditory dimensions (frequency and modulation rate) results in a larger number of distinguishable ringing codes than is possible by utilizing only one auditory dimension to distinguish the various ringing codes.

BRIEF DESCRIPTION OF THE DRAWING

The characteristics and operation of the present invention will be more apparent from the following detailed description taken in conjunction with the drawing in which.

GENERAL DESCRIPTION

This patent application is being filed concurrently with D. M. Embree-D. C. Goldthorp-H. H. Longenecker-D. R. Vogelpohl, filed on Feb. 28, 1983, Ser. No. 470,150.

Figure 1:
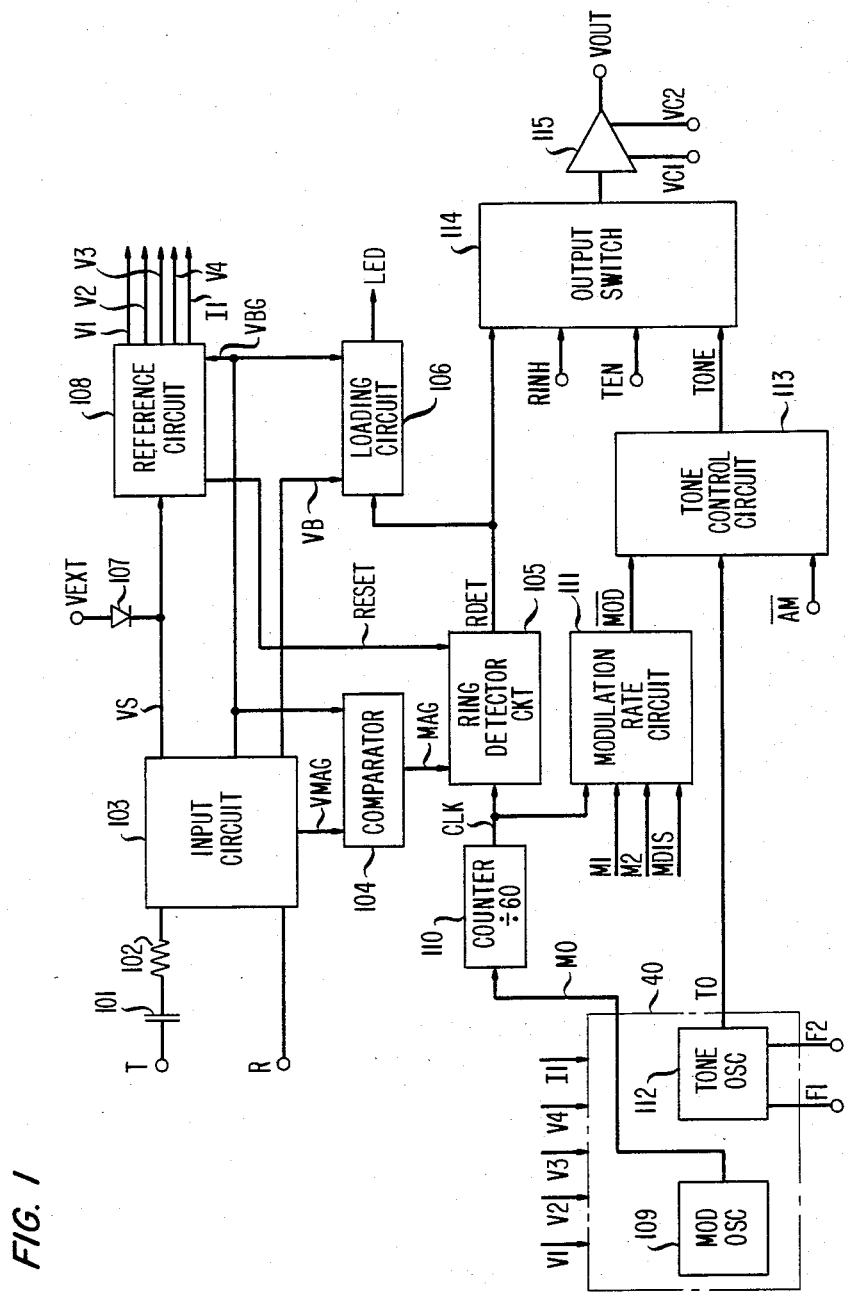
FIG. 1 is a simplified block diagram of a telephone ringing circuit useful in describing the present invention.
Figures 2, 3:
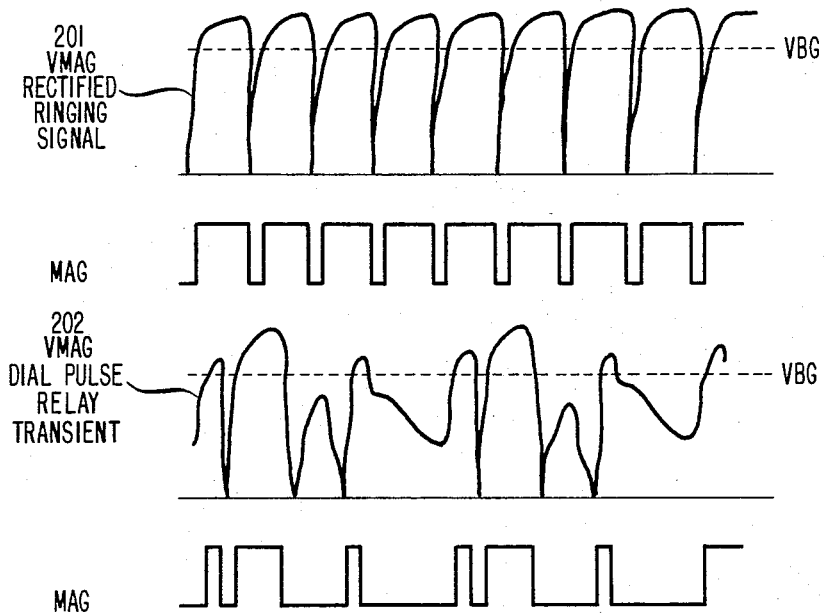
FIG. 2 shows typical signals into and out of the ring signal comparator circuit.
FIG. 3 shows a table of valid ringing codes according to the present invention.
Figure 4:
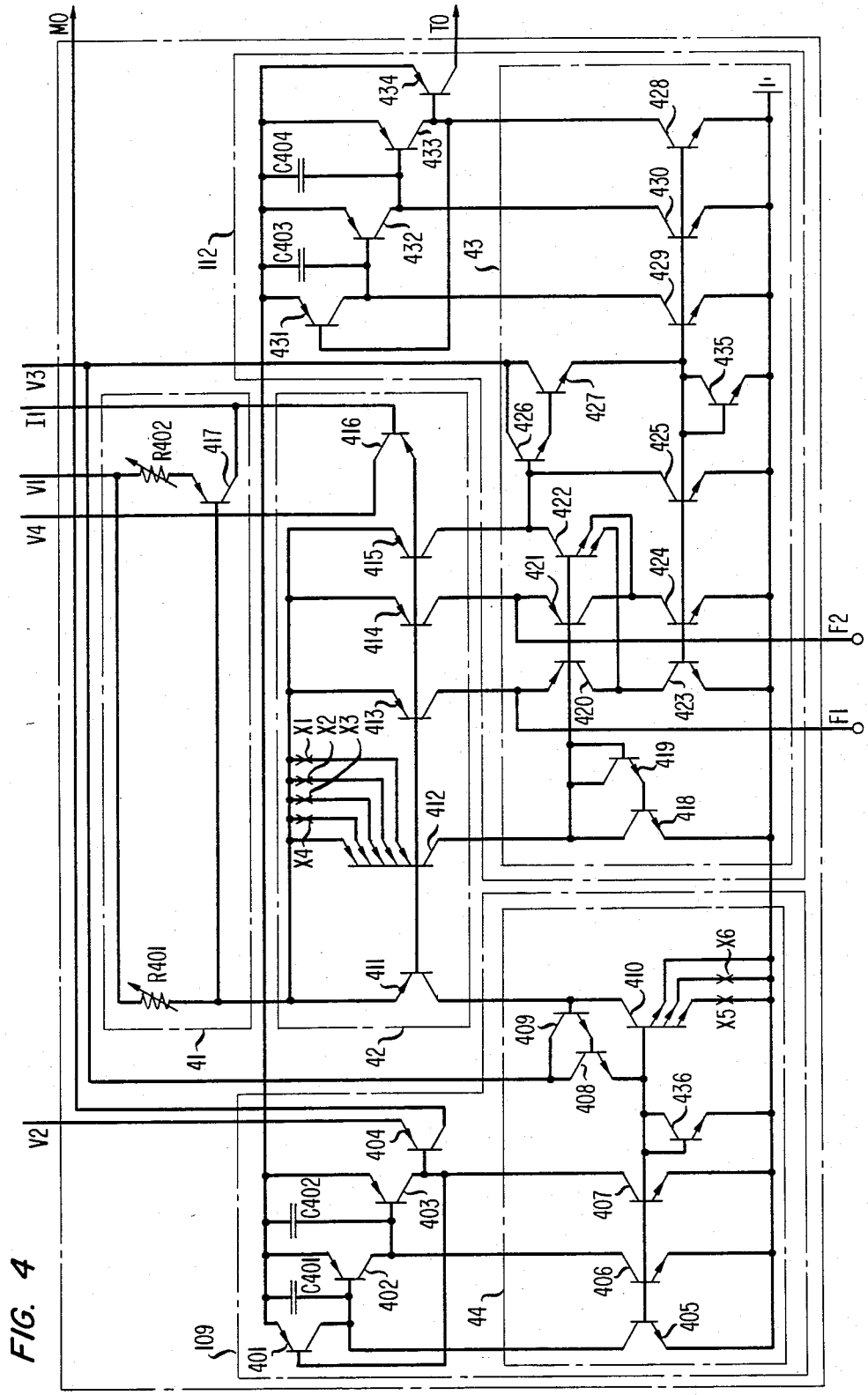
FIG. 4 shows a schematic of the frequency oscillator and modulation oscillator in accordance with the present invention.
Figure 5:
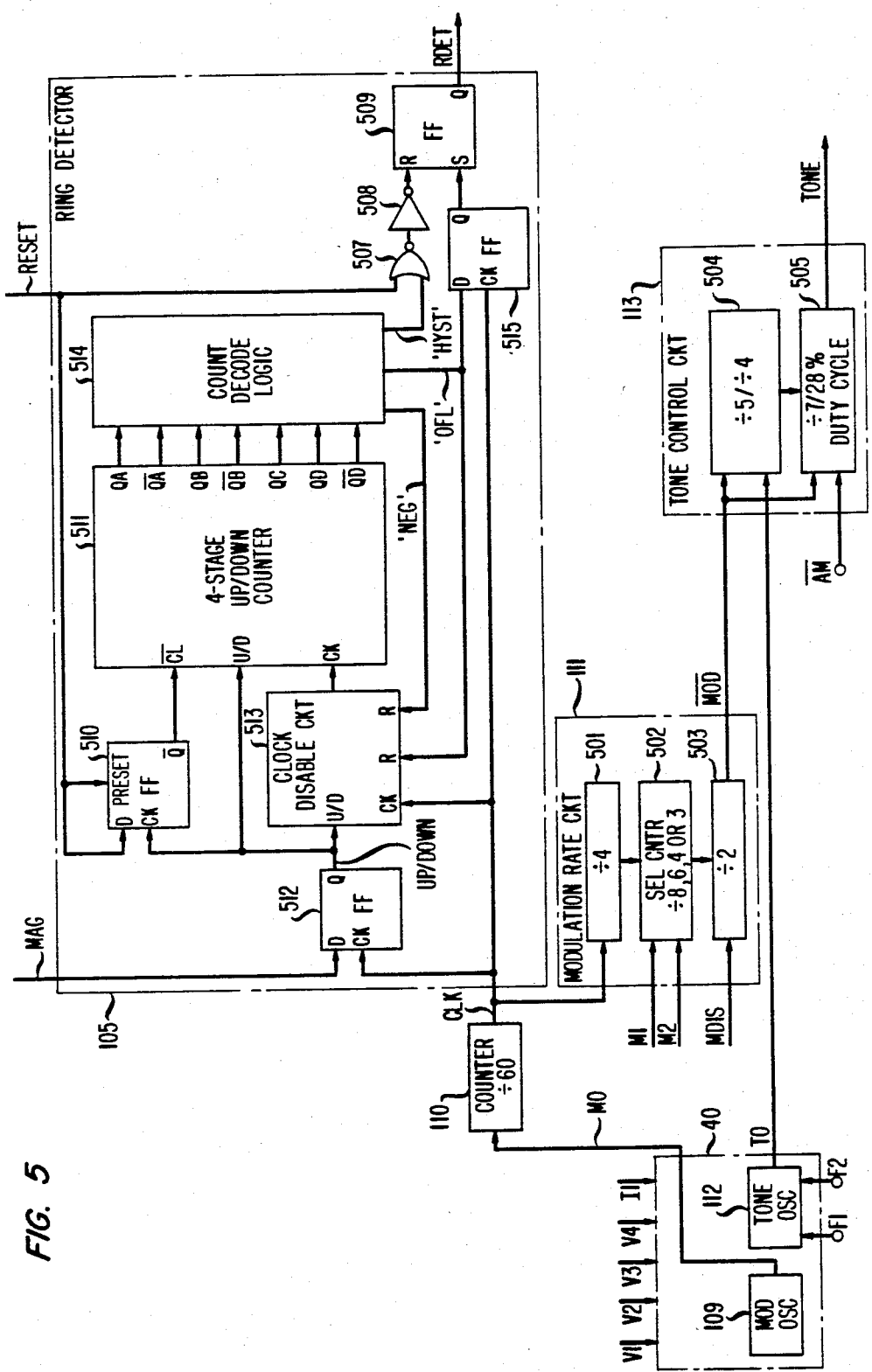
FIG. 5 shows a schematic of logic circuits used in the modulation rate circuit, tone control circuit and ring detector circuit of the present invention.

FIG. 1 shows a block diagram of a telephone ringing circuit utilizing the present invention. Input Circuit 103 is ac coupled to telephone line T,R via a series resistor 102 and capacitor 101. Input Circuit 103 includes standard full-wave bridge rectifier, voltage divider, surge protection circuit and power supply circuits. The voltage divided rectified ring signal, VMAG, from Input Circuit 103 connects to Ring Signal Magnitude Comparator 104. Magnitude comparator 104 compares VMAG against a bandgap reference voltage VBG from Reference Generating Circuit 108. The output, MAG, from Magnitude Comparator 104 provides an input to the Ring Detector Circuit 105. The signal MAG is a digital logic signal which is logic 1 during the time when signal VMAG exceeds VBG and is logic 0 during the time when VBG exceeds VMAG. Shown in FIG. 2 are typical MAG signals which are generated by the Comparator Circuit 104 in response to a VMAG ringing signal 201 and dial pulse transient signal 202.

An output voltage VB of Input Circuit 103 connects to Bridge Loading Circuit 106 which provides a nonlinear load to signals appearing on telephone line T,R. Loading Circuit 106 provides a high impedance for low voltage voice signals and an appropriately low impedance for higher voltage ringing signals. Loading Circuit 106 attenuates the signals on the output of Input Circuit 103 such that the output MAG of Magnitude Comparator 104 is high, on the average, for a predominantly longer period of time for valid ringing signals, and is low, on the average, for a longer period of time for dial pulse transients (see FIG. 2).

Loading Circuit 106 enables the Ring Detector Circuit 105 to distinguish valid from invalid ringing signals as described in a later paragraph. The operation relies on the principle that since dial pulse or switchhook transients represent reverse emf inductive energy, they are dissipated and attenuated on a time average basis to a greater degree than the minimum central office ringing voltage when subjected to a low impedance load.

Loading Circuit 106 also provides an output lead, LED, which provides a constant current to operate a light-emitting-diode (LED) or other output device during the time when a ringing signal exists on line T,R, as determined by valid ring signal RDET from Ringing Detector Circuit 105. Signal RDET also removes the low impedance of Loading Circuit 106 from across the line T,R once a valid ringing signal is detected.

The voltage VS from Input Circuit 103 connects to diode 107 and Reference Voltage and Current Generating Circuit 108. The voltage VBG is used as a reference by various circuits of the Telephone Ringing Circuit (FIG. 1). Diode 107 provides a capability for using an external dc voltage VEXT to power the Telephone Ringing Circuit when no ringing signals are present on the line T,R. This feature is utilized, for example, during paging signaling.

Reference Circuit 108 receives dc voltage VS from Input Circuit 103 and provides, in a standard manner, reference voltages V1–V4 and current I1 to other circuits of FIG. 1. Reference Circuit 108 also provides a power-up reset signal, RESET, for initializing Ring Detector Circuit 105. Modulation Oscillator 109 which operates at 28.8 KHz is divided down by a factor of 60 by counter 110. The output of counter 110 is used to provide a 480 Hz clock signal CLK which is used by Ring Detector 105 and Modulation Rate Circuit 111.

Ring Detector Circuit 105 uses the magnitude signal, MAG, to enable an up/down counter which counts clock signals, CLK, to determine if the signal on the line T,R is a ringing signal or a dialing transient. The reset signal, RESET, initializes Ring Detector Circuit 105 when power is first applied to Telephone Ringing Circuit, FIG. 1. The ring detected signal, RDET, is utilized by the Bridge Loading Circuit 106, as previously noted, and also enables Output Switch 114.

Frequency Oscillator 112 can be switched to provide any one of four different frequencies under external control via leads F1, F2. The logic signals on leads F1, F2 are either manually selected by the user using switches (not shown), or selected under control of other circuitry (not shown). The selected frequency is outputted on lead TO from Frequency Oscillator 112 to Tone Control Circuit 113.

Modulation Rate Circuit 111 receives clock signal CLK which is counted down to provide one of four possible modulation rates to Tone Control Circuit 113 via lead $\overline{\text{MOD}}$. The selected modulation rate is determined via leads M1, M2 which can be controlled by the telephone user via switches (not shown) or can be selected under control of other circuitry (not shown). An external modulation disable lead, MDIS, disables Modulation Rate Circuit 111 and causes a logic 1 signal on lead $\overline{\text{MOD}}$ to Tone Control Circuit 113.

Tone Control Circuit 113 receives the modulation rate control signal over lead $\overline{\text{MOD}}$. With the Modulation Rate Circuit 111 disabled $\overline{\text{MOD}}$ is at logic 1 and Tone Control Circuit 113 outputs a single frequency tone on lead TONE to Output Switch 114. When a frequency shift (i.e., frequency modulated) signal is desired then lead $\overline{\text{MOD}}$ provides a signal at the desired modulation rate. A frequency shift circuit in Tone Control Circuit 113 modulates between two frequencies having a frequency ratio of 1.25. These frequencies are generated from the frequency received over lead TO. While Tone Control Circuit 113 is described as modulating between two frequencies it is contemplated that more than two frequencies can be utilized.

An external input $\overline{\text{AM}}$ is used to select either the frequency shift or amplitude modulation (AM) mode of operation for Tone Control Circuit 113. In the AM mode a single frequency is switched on and off at the modulation rate on lead $\overline{\text{MOD}}$.

Additionally, Tone Logic Circuit 113 includes a duty cycle circuit incorporated into a divide by seven counter. This provides a tone output which is high for 28 percent of the time of each tone period. The signal on lead TONE has a 28 percent duty cycle to efficiently drive an electromagnetic transducer (not shown) via lead VOUT. Obviously, for other types of transducers or speakers a different duty cycle may be utilized.

Output Switch 114, a standard logic circuit, gates TONE lead signal to Output Amplifier 115 as a function of leads RDET, TEN and RINH. External lead ring inhibit RINH is used to inhibit ringing when the circuit is powered from central office ringing. A tone enable lead TEN allows the generation of audible output when the telephone ringing circuit is powered from an external dc voltage supply applied via lead VEXT. External diode 107 is used to decouple this voltage supply from central office ringing voltages on lead VS. When Telephone Ringing Circuit, FIG. 1, is powered from the central office ringing signal, lead RDET enables an audible output from Output Switch 114 only after the Ring Detector Circuit 105 detects a valid ringing signal.

The standard Output Amplifier 115 can drive, via lead VOUT, either a piezoelectric capacitive type transducer or an electromagnetic inductive transducer. The amplifier output can be externally controlled via volume control leads VC1 and VC2.

The table shown in FIG. 3 illustrates the effect of adding modulation rate as an auditory dimension to distinguish ringing codes. In FIG. 3 columns FA through FD represent the frequency pairs generated by using the four binary combinations of leads F1, F2 of Frequency (Tone) Oscillator 112. The rows MA through MD represent the modulation rates generated by using the 4 binary combinations possible using the modulation select leads M1, M2 is Modulation Rate circuit 111.

Using only frequency modulation (or shifting) as an auditory dimension to distinguish ringing codes results in using, for example, only frequency pairs FA and FC at modulation rate MA. These codes are shown as 1 and 2 in the table shown in FIG. 3. This assumes that frequency pair FB is not distinguishable from pair FA or FC. If a change is made to another auditory dimension, i.e., modulation rate, then frequency pair FA and FC at modulation rate MC (i.e., codes 3 and 4) can be distinguished both from each other and from frequency pair FA and FC at modulation rate MA (i.e., codes 1 and 2). This assumes that the difference in modulation rate between MA and MC are distinguishable while MB is not distinguishable from MA or MC.

Moreover, as previously noted, when both frequency shifting and modulation rate are utilized as auditory dimensions to distinguish ringing codes, then new frequency pairs and modulation rates can be added to the ringing code repertoire. These new ringing code are distinguishable from existing codes in two auditory dimensions. For example, ringing code 5 while not easily humanly distinguishable from codes 1, 2, 3, 4 on either a frequency shifting basis alone, or a modulation rate basis alone, is easily distinguishable on the combined frequency shifting and modulation rate basis. Thus, code 5 using frequency pair FB at modulation

What is claimed is:

1. A circuit responsive to a ringing signal received over a communication line for providing a user with encoded telephone ringing signals from a plurality of tones comprising:

ring detector means for detecting the existence of said ringing signal and generating an enable signal during the existence of said ringing signal, modulating means responsive to said enable signal for generating an encoded ringing signal for the user during the existence of said enable signal by modulating between at least two of said plurality of tones and means for controlling the modulation rate of said modulating means at one of a plurality of fixed rates with each rate representing a different code.

2. The circuit of claim 1 wherein said modulation rate controlling means includes first control signal for selecting a first modulation rate for a first group of said plurality of tones, and second control signal for selecting a second modulation rate for a second group of said plurality of tones.

3. The circuit of claim 2 wherein the frequencies of said first group of tones are not easily humanly distinguishable from the frequencies of said second group of tones and wherein the modulation rate of said first modulation rate is not easily humanly distinguishable from the modulation rate of said second modulation rate.

4. The circuit of claim 3 wherein the respective frequencies of said first and second group of tones have a frequency ratio in the range 1.6–2.0 to 1 and wherein said first and second modulation rates have a modulation ratio in the range 2.6–3.0 to 1.

5. The circuit of claim 1 wherein said circuit further includes means for binarily encoding the amplitude of encoded signals generated by said modulating means into one of a plurality of codes in response to an amplitude control signal.

6. The circuit of claim 5 wherein said circuit further includes means for generating said amplitude control signal from the detected envelope of said ring signal.

7. The circuit of claim 5 wherein the encoded signals of said modulation means and said amplitude encoding means represent different types of information.

8. A method of providing encoded telephone ringing signals from a plurality of tones in response to a ringing signal received over a communication line comprising the steps of:

detecting the existence of said ringing signal and generating an enable signal during the existence of said ringing signal, modulating between at least two of said plurality of tones to generate an encoded ringing signal for the user during the existence of said enable signal and controlling the modulation rate of said modulating step at one of a plurality of fixed rates with each representing a different code.

9. The method of claim 8 wherein said controlling step includes the steps of:

selecting a first modulation rate for a first group of said plurality of tones, and selecting a second modulation rate for a second group of said plurality of tones.

10. The method of claim 9 wherein the frequencies of said first group of tones are not easily humanly distinguishable from the frequencies of said second group of tones and wherein the modulation rate of said first modulation rate is not easily humanly distinguishable from the modulation rate of said second modulation rate.

11. The method of claim 10 wherein the respective frequencies of said first and second group of tones have a frequency ratio in the range 1.6–2.0 to 1 and wherein said first and second modulation rates have a modulation ratio in the range 2.6–3.0 to 1.

12. The method of claim 8 further including the step of:

binarily encoding the amplitude of encoded signals generated during said modulating step into a plurality of codes in response to an amplitude control signal.

* * * * *